March 28, 1967  F. SCHLOSS  3,311,873
INTENSITY METER, PARTICLE ACCELERATION TYPE
Filed Nov. 10, 1965
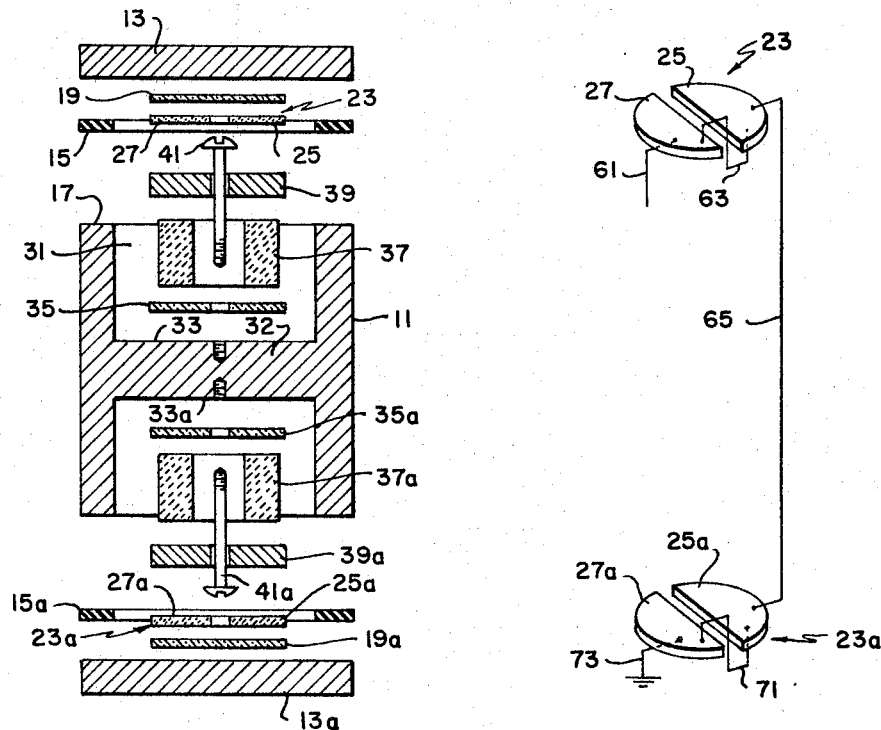
FIG. 1.
FIG. 3.
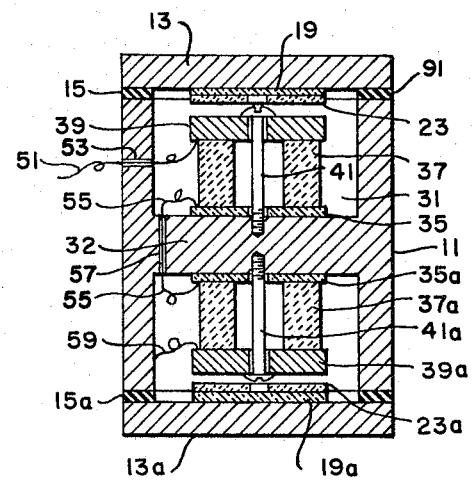
FIG. 2.
INVENTOR.
FRED SCHLOSS
BY
ATTYS.

United States Patent Office 3,311,873
Patented Mar. 28, 1967

3,311,873
INTENSITY METER, PARTICLE
ACCELERATION TYPE
Fred Schloss, Arlington, Va., assignor to the United States of America as represented by the Secretary of the Navy
Filed Nov. 10, 1965, Ser. No. 507,255
10 Claims. (Cl. 340—10)

The invention described herein may be manufactured and used by or for the Government of the United States of America for governmental purposes without the payment of any royalties thereon or therefor.

The present invention relates to an acoustic intensity meter which conventionally includes a force measuring device and an accelerometer and more particularly to an acoustic intensity meter which has both components compactly mounted in single housing.

The patent to George L. Boyer, 3,158,831 overcomes most of the inherent difficulties of measuring pressure and particle velocity and calculating the sound intensity. However, the Boyer device contains two separate sensors which are mounted at right angles to each other and are in separate housing.

The present invention eliminates the defects present in the prior art device by providing a single housing for containing both the accelerometer and the force sensing element, which may be hydrophone. In addition, the acoustic intensity meter of the present invention can be made to have much smaller physical characteristics and therefore have a greater acoustic sensitivity. The problem of electrical ground loops have been eliminated by encasing the completed unit in polyurethane.

An object of the present invention is to provide an apparatus for measuring the acoustical intensity in a field due to a source of sound.

Another object of the present invention is to provide an acoustic intensity meter for measuring acoustic intensity over a wide frequency range.

Still another object of the invention is to provide an acoustic intensity meter for measuring the acoustic intensity at a single point in space.

A further object of the invention is to provide an acoustic intensity meter which does not have any unwanted ground loops.

A still further object of the invention is to provide an acoustic intensity meter having a very low transverse sensitivity.

Very briefly the invention contains a pair of accelerometers which are electrically connected in series and a pair of hydrophones which are electrically connected in series. Each of the hydrophones contains a pair of piezoelectric crystals which are connected in series to cancel any effects of acceleration that they may encounter.

Other objects and many of the attendant advantages of this invention will be readily appreciated as the same becomes better understood by reference to the following detailed description when considered in connection with the accompanying drawings wherein:

FIG. 1 is an exploded view of an acoustic intensity meter constructed in accordance with the present invention;

FIG. 2 is a sectional view of an acoustic intensity meter constructed in accordance with the present invention; and FIG. 3 is wiring diagram of the hydrophone utilized in the present invention.

Referring to FIGS. 1 and 2 simultaneously, a housing 11 is provided which, in the preferred embodiment is made out of beryllium. The housing 11 is provided with a first beryllium end cap 13 which has one side of a thin rubber gasket 15 cemented around its periphery and the other side of the thin rubber gasket 15 is cemented to the edge 17 of the housing 11. The beryllium end cap 13 is provided with a glass insulating disc 19 which has one of its faces cemented to the beryllium end cap. A piezoelectric crystal 23 is cemented to the glass insulating disc 19. The piezoelectric crystal 23 is cut into along its diameter forming two halves 25 and 27. The crystal halves 25 and 27 have the usual electrodes on their surfaces, not shown. The housing 11 is provided with an inner cavity 31 formed by the cross member 32 having a surface 33. A second insulating glass washer 35 is cemented to the surface 33 of the housing. A ring type piezoelectric crystal 37 is then placed on top of the glass insulating disc 35. The piezoelectric ring crystal 37 has the usual electrodes on its upper and lower surfaces, not shown. A tungsten mass 39 is then mounted on top of the piezoelectric ring crystal 37 and loads the crystal in the 3, 3 mode. The ring crystal 37 cooperates with the constant mass 39 to form a piezoelectric accelerometer. A screw 41 having an electrically insulating coating is provided for fastening down the ring crystal 37 and the mass 39 to the cross member 32. It is to be noted, although it is not shown, that there is a small amount of clearance between the head of the screw 41 and the piezoelectric crystal 23, leaving room for the piezoelectric crystals 25 and 27 to move freely.

Similarly a second group of elements and components which bear corresponding indicia with the addition of subscript $a$ are symmetrically provided on the other side of the housing 11 and are mounted in the same functional relationship as the components described above. The housing 11 is used as a ground reference point for both the accelerometer crystal 37a and for the bottom of the hydrophone crystal 27a. The following wiring connections are made: a leading wire 51 passes through a hole 53 in the housing 11 and is connected to the top electrode of the piezoelectric ring crystal 37. A second wire 55 is connected to the bottom electrode of a piezoelectric ring crystal 37 and to the top electrode of piezoelectric ring crystal 37a. A wire 59 has one of its ends connected to the bottom electrode of the piezoelectric ring crystal 37a and its other end connected to the housing 11 for establishing the ground connection. Referring to the connection of crystals 23 and 23a reference is made to FIG. 3, a wire 61 passes through the opening 53 and connected to the bottom electrode of the crystal element 27. The top electrode of the crystal element 27 is connected by way of a wire 63 to the bottom electrode of the crystal 25. The top electrode of the crystal 25 is connected by way of a wire 65 passes through the hole 57 and connects up with the top electrode of the crystal 25a. The bottom electrode of the crystal 25a is connected by way of wire 71 to the top electrode of the crystals 27a. The bottom electrode of the crystal 27a is connected by way of a wire 73 to the beryllium housing 11 which is not illustrated in FIG. 2.

The entire unit as illustrated in FIG. 2 is potted in a relatively thin layer of polyurethane. If desired an operation amplifier can be physically connected to the outer housing 11 and mounted together in the same polyurethane coating 91. Thereafter output leads will be connected to the amplifier to bring the detected signal up to the processing equipment, as a land station or on to a ship. It is to be noted that both sets of crystals 25, 27, 25a and 27a are connected in series so as to cancel out the effects of acceleration on the piezoelectric crystals which form the four sensing element of the hydrophone. Similarly crystals 37 and 37a forming the accelerometer are connected in series to provide a system having substantially no transverse sensitivity to acceleration. The crystals are electrically connected in such a fashion that any signal generated due to a transverse motion of the device will be cancelled.

In operation a wave front hitting the end cap member 13 causes the whole unit to move thereby producing an acceleration signal as is well known in the prior art across the elements 37 and 37a. Simultaneously the same wave impinges with a force on the first beryllium end cap 13 causing the end cap to distort and thereby inducing a strain in crystals 25 and 27 causing an output signal to be generated by the crystals 25 and 27.

Obviously many modifications and variations of the present invention are possible in the light of the above teachings. It is therefore to be understood that within the scope of the appended claims the invention may be practiced otherwise than as specifically described.

What is claimed is:

1. A hydrophone having substantially no response to transverse forces and substantially no acceleration sensitivity comprising:
    a housing being provided with a first end cap and a second end cap;
    a first pair of piezoelectric crystals being electrically insulated from said first end cap and mounted on said end cap; and
    a second pair of piezoelectric crystals being electrically insulated from said second end cap and mounted on said second end cap, said first pair of piezoelectric crystals and said second pair of piezoelectric crystals being connected in series whereby the sum of the signals generated in said piezoelectric crystals due to their acceleration is substantially zero.

2. A hydrophone as defined in claim 1 but further characterized by having a first thin rubber ring and a second thin rubber ring, said first rubber ring being mounted between said first end cap and said housing and said second thin rubber ring being mounted between said second end cap and said housing.

3. A hydrophone as defined in claim 2 but further characterized by having said end caps made out of beryllium and said hydrophone being completely coated with a relatively thin coat of polyurethane.

4. A piezoelectric accelerator being insensitive to transverse motion comprising:
    first and second mass means for loading piezoelectric crystals in the 3, 3, mode;
    a first piezoelectric crystal having said first mass mounted on one side of said first piezoelectric crystal and loading said first piezoelectric crystal in the 3, 3, mode;
    a second piezoelectric crystal having said second mass mounted on one side of said second piezoelectric crystal and loading said second piezoelectric crystal in the 3, 3, mode; and
    common mounting means having a pair of diametrically opposed surfaces and said first piezoelectric crystal having its free side electrically insulatively mounted on one of said surfaces and said second piezoelectric crystal having its free side electrically insulatively mounted on the other one of said surfaces whereby said piezoelectric crystals are substantially insensitive to transverse accelerations.

5. A piezoelectric accelerator as defined in claim 4 but further characterized by said first and second piezoelectric crystals each having a pair of electrodes and both of said piezoelectric crystals being electrically connected in series.

6. A device as claimed in claim 3 wherein said housing contains a common mounting means having a pair of diametrically opposed surfaces;
    first and second masses for loading piezoelectric crystals in the 3, 3, mode;
    a first acceleration responsive piezoelectric crystal having said first mass mounted on one side of said first piezoelectric crystal and loading said first acceleration responsive piezoelectric crystal in the 3, 3, mode and said first acceleration responsive piezoelectric crystal having its free side electrically insulatively mounted on one of said diametrically opposed surfaces; and
    a second acceleration responsive piezoelectric crystal having said second mass mounted on one side of said second acceleration responsive piezoelectric crystal and loading said second acceleration responsive piezoelectric crystal in the 3, 3, mode and second acceleration responsive piezoelectric crystal having its free side electrically insulatively mounted on said other one of said diametrically opposed surfaces whereby said acceleration responsive piezoelectric crystals and said hydrophone may be utilized to detect acoustic intensities.

7. A device as claimed in claim 6 wherein said first and second acceleration responsive piezoelectric crystals each have a pair of electrodes and both of said first and second acceleration responsive piezoelectric crystals being electrically connected in series.

8. A device as claimed in claim 2 wherein said housing contains a common mounting means having a pair of diametrically opposed surfaces;
    first and second masses for loading piezoelectric crystals in the 3, 3, mode;
    a first acceleration responsive piezoelectric crystal having said first mass mounted on one side of said first piezoelectric crystal and loading said first acceleration responsive piezoelectric crystal in the 3, 3, mode and said first acceleration responsive piezoelectric crystal having its free side electrically insulatively mounted on one of said diametrically opposed surfaces; and
    a second acceleration responsive piezoelectric crystal having said second mass mounted on one side of said second acceleration responsive piezoelectric crystal and loading said second acceleration responsive piezoelectric crystal in the 3, 3, mode and second acceleration responsive piezoelectric crystal having its free side electrically insulatively mounted on said other one of said diametrically opposed surfaces whereby said acceleration responsive piezoelectric crystals and said hydrophone may be utilized to detect acoustic intensities.

9. A device as claimed in claim 8 wherein said first and second acceleration responsive piezoelectric crystals each have a pair of electrodes and both of said first and second acceleration responsive piezoelectric crystals being electrically connected in series.

10. A device as claimed in claim 1 wherein said housing contains a common mounting means having a pair of diametrically opposed surfaces;
    first and second masses for loading piezoelectric crystals in the 3, 3, mode;
    a first acceleration responsive piezoelectric crystal having said first mass mounted on one side of said first piezoelectric crystals and loading said first acceleration responsive piezoelectric crystal in the 3, 3, mode and said first acceleration responsive piezoelectric crystal having its free side electrically insulatively mounted on one of said diametrically opposed surfaces; and a second acceleration responsive piezoelectric crystal having said second mass mounted on one side of said second acceleration responsive piezoelectric crystal and loading said second acceleration responsive piezoelectric crystal in the 3, 3, mode and second acceleration responsive piezoelectric crystal having its free side electrically insulatively mounted on said other one of said diametrically opposed surfaces whereby said acceleration responsive piezoelectric crystals and said hydrophone may be utilized to detect acoustic intensities.

References Cited by the Examiner
UNITED STATES PATENTS 2,726,074  12/1955  Ketchledge _____ 310—8.4 X CHESTER L. JUSTUS, *Primary Examiner.*
B. L. RIBANDO, *Assistant Examiner.*